United States Patent
Sullivan et al.

(10) Patent No.: US 8,103,250 B2
(45) Date of Patent: Jan. 24, 2012

(54) SYSTEM AND METHOD FOR SHARING LOCATION DATA IN A WIRELESS COMMUNICATION NETWORK

(75) Inventors: Marc Sullivan, Austin, TX (US); James Pratt, Round Rock, TX (US); Steven M. Belz, Cedar Park, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 411 days.

(21) Appl. No.: 12/328,571

(22) Filed: Dec. 4, 2008

(65) Prior Publication Data

US 2010/0144368 A1    Jun. 10, 2010

(51) Int. Cl.
*H04W 88/02*    (2009.01)
(52) U.S. Cl. .................... 455/411; 455/456.1
(58) Field of Classification Search ............... 455/456.1, 455/456.2, 411, 412, 447, 557; 707/748; 340/573.1; 701/201, 208, 213; 342/357.25
See application file for complete search history.

(56) References Cited

U.S. PATENT DOCUMENTS

| | | | |
|---|---|---|---|
| 7,353,034 B2 | 4/2008 | Haney | |
| 2006/0058951 A1* | 3/2006 | Cooper et al. | 701/208 |
| 2006/0080032 A1* | 4/2006 | Cooper et al. | 701/208 |
| 2006/0085419 A1 | 4/2006 | Rosen | |
| 2008/0039121 A1 | 2/2008 | Muller et al. | |
| 2008/0214204 A1 | 9/2008 | Ramer et al. | |
| 2008/0249969 A1 | 10/2008 | Tsui et al. | |
| 2010/0124196 A1* | 5/2010 | Bonar et al. | 370/329 |

* cited by examiner

*Primary Examiner* — Diane Mizrahi
(74) *Attorney, Agent, or Firm* — Parks IP Law LLC; Li K. Wang, Esq.

(57) ABSTRACT

A system and method for sharing location data amongst wireless communication devices uses a token system to grant permission to share location data. The tokens may be created automatically as the result of user activation of a different function. Location data may be exchanged when two wireless communication devices, authorized to exchange location data, are within a predetermined distance from each other. Location data may also be automatically exchanged upon the occurrence of a scheduled calendar event within a wireless communication device. Location data may be exchanged a single time or can be exchanged on a continuous or periodic basis so long as the token still exists. The token may be destroyed manually by some user activity or may be terminated automatically.

20 Claims, 4 Drawing Sheets

SYSTEM AND METHOD FOR SHARING LOCATION DATA IN A WIRELESS COMMUNICATION NETWORK

BACKGROUND OF THE INVENTION

1. Field of the Invention

The present invention is directed generally to the use of location data in a wireless communication network and, more particularly, to a system and method for sharing location data in a wireless communication network.

2. Description of the Related Art

Wireless communication is common today. Although basic wireless communication has been available for some time, additional features are constantly being added by service providers. One such technical feature is the addition of location-based services. Through a variety of techniques, it is possible to determine the location of an individual wireless communication device with a reasonable degree of accuracy. Based on the location of the device, the service provider may send additional information to the wireless device, such as a map indicating the location of the device, retail information (e.g., a nearby restaurant), and the like.

Location data may be derived through various known techniques using the communication network. In addition, wireless communication devices may include a global positioning system (GPS) receiver. As is known in the art, a GPS receiver can determine the location of the device with a high degree of accuracy. In other circumstances, such as a poor GPS signal, network sometimes use a combination of GPS data and network-derived data to determine the location of a wireless communication device. Thus, there are a number of conventional techniques that may be used to derive location data.

As more individuals utilize devices capable of determining location data, there is an increasing need to be able to control one's own visibility to others and thus enable (or disable) visibility based on who the user wants to be able to determine the user's location. One current solution to this problem is to allow each device to act independently and download location data in order to compare their location. This approach requires explicit authorization by the user of each wireless communication device. With such explicit permission requirements, enabling or disabling visibility of location data can be cumbersome.

In another approach, the wireless communication devices are organized in a hierarchical manner. Specifically, one user must have supervisory control over both wireless communication devices. The individual having hierarchical control may use a third device to track the two other devices. Unfortunately, this approach provides no mechanism to allow a device owner to remove the tag enabling visibility on his or her device. Consequently, any exchange of location information is on a quasi-permanent basis.

Thus, it can be appreciated that there is a significant need for a system and method that allows simple techniques for enabling or disabling location data visibility among wireless communication devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

As will be described in detail herein, if two or more wireless communication devices that are capable of receiving and displaying location data can be enabled in such a way as to share their respective location information with each other. The users of the respective enabled devices are thus able to monitor the other individuals' locations. A wireless communication system constructed in accordance with the present teachings provide a simple token system that enables one device to share its location data with any other enabled device. The following description refers to location data derived from a global positioning system (GPS). However, the system is equally applicable to network-derived location data and the sharing thereof.

Figure 1:
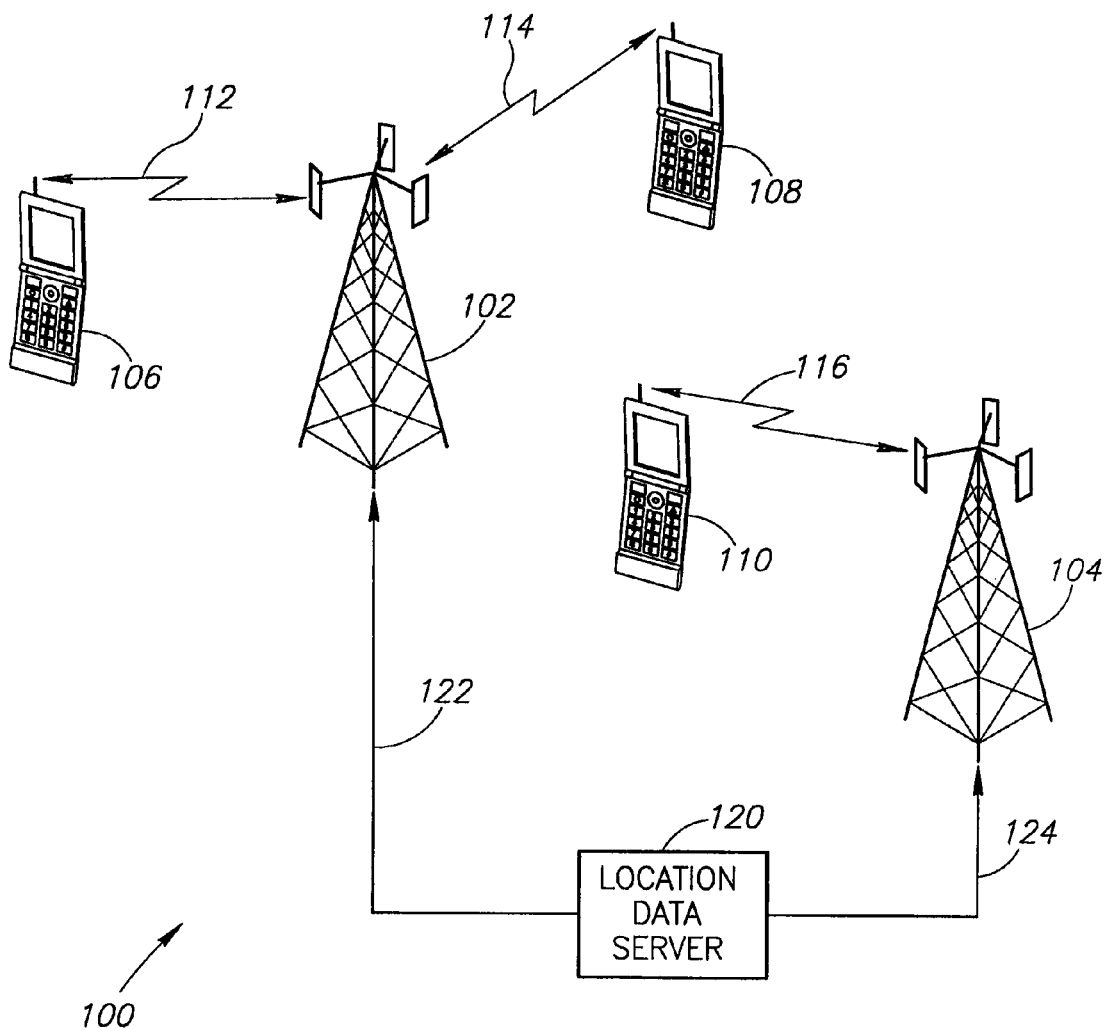
FIG. 1 illustrates an exemplary system architecture used in accordance with the present teachings.

FIG. 1 illustrates a system 100 constructed in accordance with the present teachings. The system 100 includes a base station 102 and a base station 104. Mobile devices 106 and 108 communicate with the base station 102 via wireless communication links 112 and 114, respectively. A wireless communication device 110 communicates with the base station 104 via a wireless communication link 116. The base station 102 and the base station 104 are communicatively coupled to a location data server 120 via communication links 122 and 124, respectively. The communication links 122 and 124 may be hard wired communication links, optical communication links, wireless communication links, or a combination of one or more of the above.

Those skilled in the art will recognize that a typical wireless communication network includes a larger number of base stations and each base station typically has a larger number of mobile units communicating therewith. However, for the sake of simplicity, the system of FIG. 1 illustrates only two base stations and a small number of wireless communication devices.

The wireless communication devices 106-110 are illustrative of a number of known communication devices, such as cell phones, PCS devices, personal digital assistant (PDA) devices, web-enabled wireless devices, wireless computers, and the like. In addition, the system 100 is illustrative of many forms of wireless communication networks. As those skilled in the art can appreciate, a wireless network can be implemented in accordance with a number of well-known communication protocols, multiple access techniques, modulation techniques, frequency bands, and the like. The system 100 is not limited to any specific form of wireless communication or wireless communication protocol.

For the sake of clarity, FIG. 1 also does not illustrate a number of conventional infrastructure elements, such as a mobile switching center, master control server, gateways, and other well-known elements used to implement a wireless communication network. These conventional elements are well-known and well understood by those of ordinary skill in the art and need not be described herein.

As will be described in greater detail below, the mobile communication devices may exchange tokens thereby enabling devices to share location data. In an exemplary embodiment, the location data is sent from each of the respective wireless communication devices (that are enabled) and will share that location data with other enabled wireless communication devices.

A token is a type of authentication security device that may be used to authorize the use of computer services. In two-way communication, tokens are often used to generate unique, 1-time passwords known by both devices, but unknown to other devices. In one implementation, the token can be a simple password while, in an alternative embodiment, a token may serve as a key to an encryption key. The system 100 uses a token to permit one user to authorize the use of their location data by another user. Because the token is required by both parties (or multiple parties), if either party destroys (i.e., cancels) the token session, the connection is dropped and location data is no longer shared.

A token may be transient or permanent. While the ad hoc creation and destruction of tokens is an advantage to location data sharing in the system 100, there are situations where a permanent token may be useful. For example, a parent may wish to monitor the location of a teenage child. The system 100 has provisions for such permanent tokens. However, expiration of transient tokens may occur at the conclusion of a set time period, the occurrence of a certain event, or may be cancelled by the user.

Figure 2:
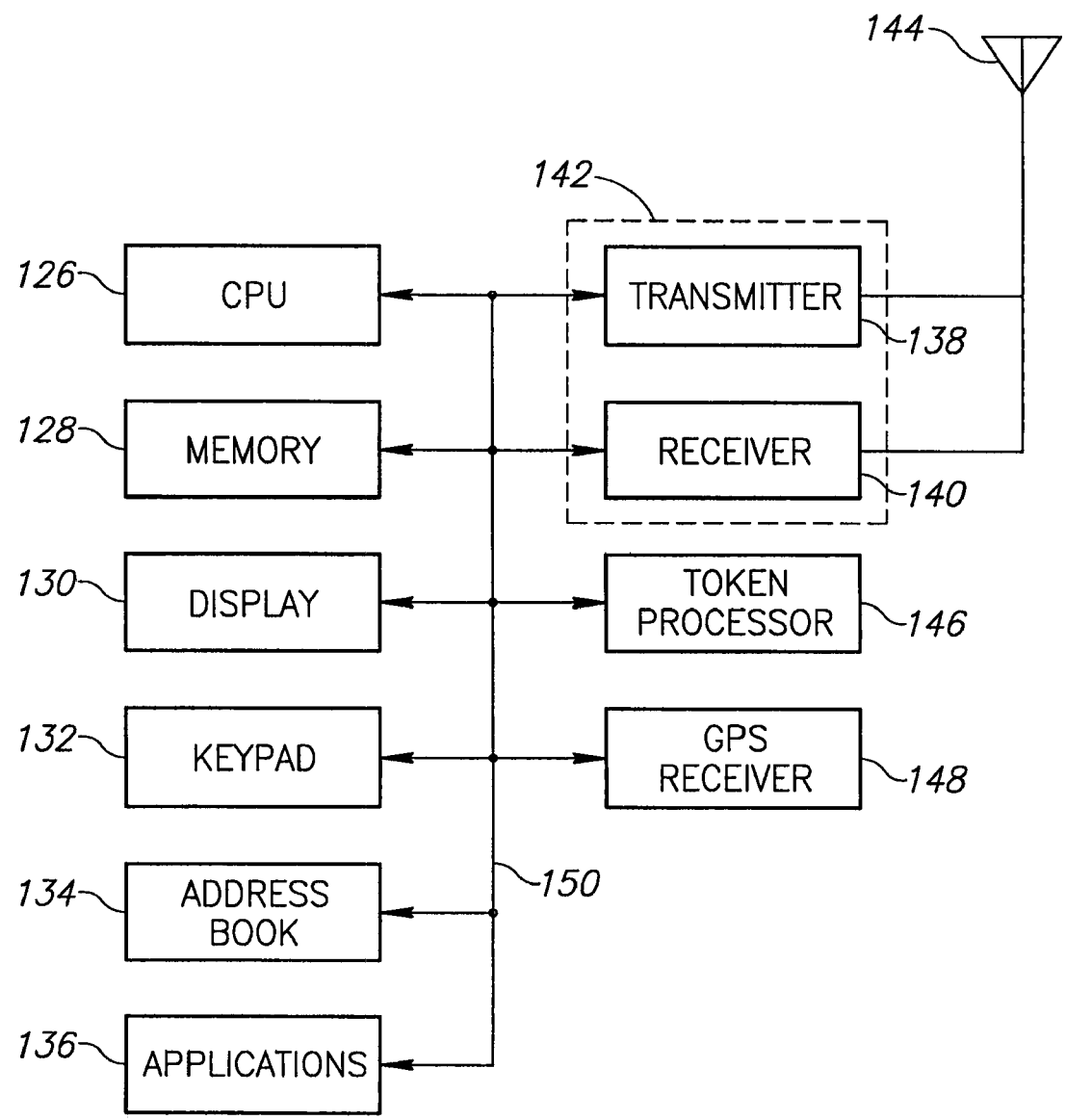
FIG. 2 is a functional block diagram of a wireless communication device constructed in accordance with the present teachings.

FIG. 2 is a functional block diagram of the wireless communication device 106. However, the functional block diagram of FIG. 2 is equally applicable to the wireless communication devices 108 and 110. As noted above, the wireless communication devices 106-110 are representative of a broad class of wireless communication devices. The wireless communication device 106 includes a central processing unit (CPU) 126 and a memory 128. In general, the memory 128 stores data and instructions that control the operation of the CPU 126. The CPU 126 may be implemented using a variety of known technologies. For example, the CPU 126 may be a conventional microprocessor, a microcontroller, a digital signal processor, a programmable gate array, custom circuit, or the like. The wireless communication device 106 is not limited by the specific form of the components used to implement the CPU 126.

Similarly, the memory 128 may be implemented using a variety of known technologies. The memory 126 may include random access memory, read-only memory, flash memory, programmable memory, removable memory storage devices, or the like. In one embodiment, a portion of the memory 128 may be integrated into a device along with the CPU 126. The wireless communication device 106 is not limited by the specific form of the components used to implement the memory 128.

The wireless communication device 106 also includes conventional components, such as a display 130 and a keypad 132. If the wireless communication device is, by way of example, a laptop computer, the keypad may actually be implemented as a full keyboard. Similarly, the display 130 may be a relatively small display in a cell phone or PDA and is implemented as a larger display device in a wireless computer. For the sake of simplicity, other conventional components, such as cursor control device, audio input device, audio output device, and mass storage devices are not shown in the functional block diagram of FIG. 2.

FIG. 2 also illustrates an address book 134 and refers generally to applications 136. As will be discussed in greater detail below, the address book 134 can be used to automatically enable the sharing of location data with contacts designated in the address book 134 when those contacts come within a predetermined geographical proximity to the user of the device 106. Similarly, applications 136, such as a calendar function may also be used to automatically enable the sharing of location data.

The wireless communication device 106 also includes a transmitter 138 and receiver 140, such as may be used for normal wireless communication with the base station 102 (see FIG. 1). In a typical embodiment, the transmitter 138 and receiver 140 may be implemented as a transceiver 142. The transceiver 142 is coupled to an antenna 144. Operation of the transceiver 142 and antenna 144 is well-known in the art and need not be described in greater detail herein. However, those skilled in the art will appreciate that the principles of the present disclosure are applicable to various wireless communication standards and various multiple access techniques.

The wireless communication device 106 also includes a location data processor 146. As will be described in greater detail below, the location data processor 146 processes tokens to enable or disable sharing of location data Techniques used to generate tokens and to terminate tokens will be described in detail below.

FIG. 2 also illustrates an optional GPS receiver 148. As discussed above, the wireless communication device 106 may include on-board location data generating capability, such as that provided by the GPS receiver 148. In other embodiments, the wireless communication device 106 may communicate with the wireless communication network and utilize network-based location technology to generate location data for the wireless communication device 106.

Some components illustrated in FIG. 2, such as the location data processor 146, may be implemented as a set of computer instructions stored in the memory 128 and executed by the CPU 126. However, this component is illustrated as a separate functional block in the functional block diagram of FIG. 2 since the component performs a separate operational function within the wireless communication device 106.

The various components illustrated in FIG. 2 are coupled together by a bus system 150. The bus system 150 may comprise an address bus, data bus, control bus, power bus, and the like. For the sake of convenience, the various buses are illustrated in FIG. 2 as the bus system 150.

In a network implementation of the system 100, the location data server 120 (see FIG. 1) tracks the tokens for location data tracking permissions among the various wireless communication devices. The location data server 120 is also responsible for communicating with the enabled devices to provide the location data for the other devices.

In a typical wireless communication device, the address book 134 contains contact information for a plurality of individuals. In one embodiment, the token processor 146 automatically transmits permission to the location data server 120 (see FIG. 1) to share location data for the wireless communication device 106 with the wireless communication device of an addressee in the address book 134. In an exemplary embodiment, the permissions are granted by the token processor 146 only when the wireless communication device of the addressee is within a predetermined distance of the wireless communication device 106. The actual distance may be predetermined by the wireless communication system 100 or by the user of the wireless communication system device 106. For example, the user may select to share location information with an addressee who is within one quarter mile of the wireless communication device. In another example, the user may select to share location information with an addressee whose wireless communication device is within five hundred feet of the wireless communication device 106.

In this example, a user of the wireless communication device 106 may elect to share location data with an addressee in the address book 134. When the wireless communication device of the addressee is within the predetermined distance, the location data server (see FIG. 1) will automatically begin to share data between the wireless communication devices. As previously discussed, either user may manually opt out of any location data sharing. Alternatively, the location data sharing may automatically terminate when the wireless communication device of the addressee is at a distance from the wireless communication device 106 that exceeds the predetermined threshold.

Figure 3:
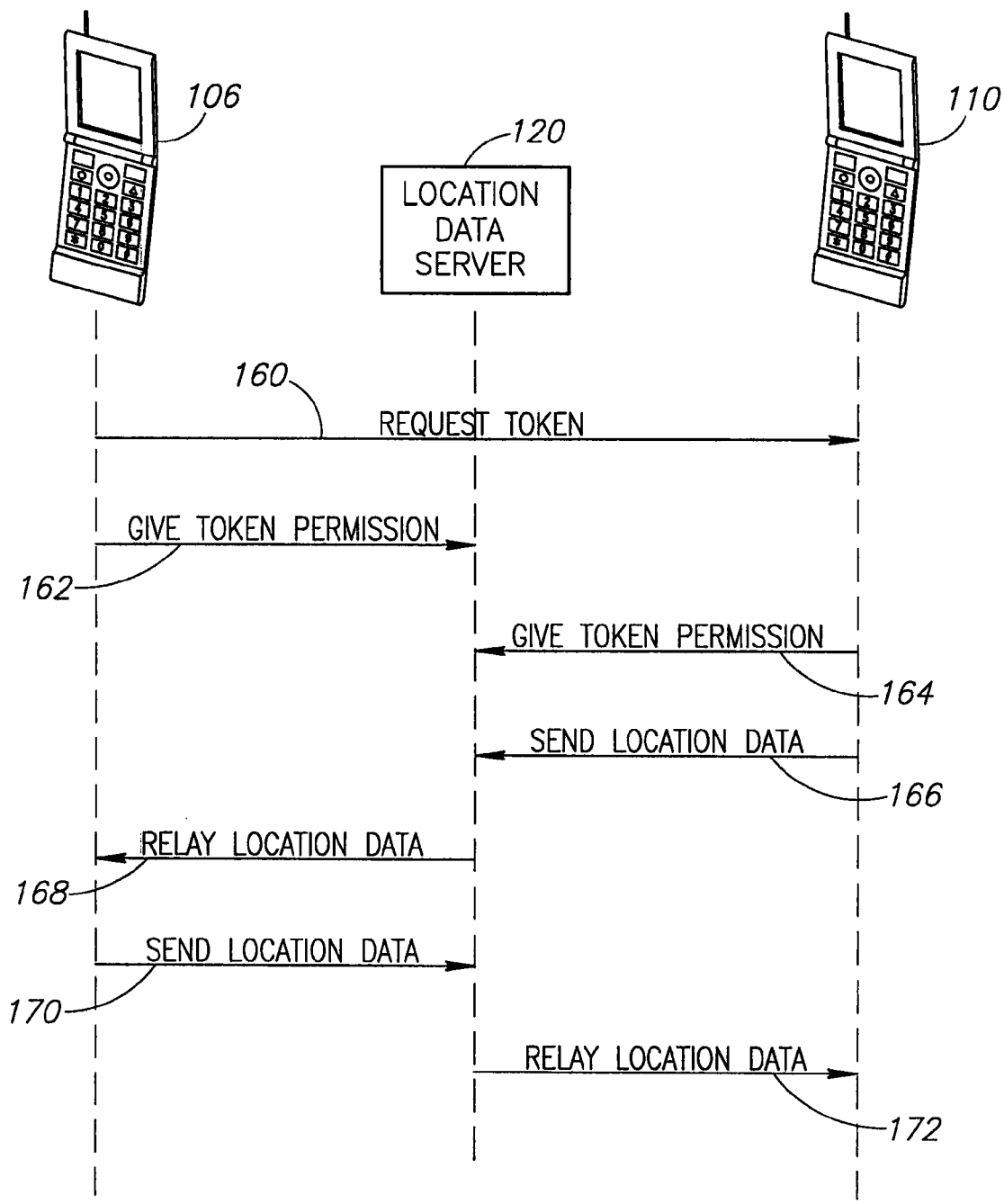
FIG. 3 illustrates a wireless communication device and an exemplary technique for enabling the sharing of location data.

FIG. 3 illustrates the communication flow between the wireless communication device 106 and the wireless communication device 110. In this example, the wireless communication device 106 is requesting the sharing of location data with the wireless communication device 110. At step 160, the wireless communication device 106 transmits a "Request Token" message to the wireless communication device 110. At step 162, the wireless communication device 106 gives its token permission to the location data server 120. In step 164, the wireless communication device 110 gives its token permission to the location data server 120. In step 166, the wireless communication device 110 sends its location data to the location data server 120.

It should be noted that the transmission of location data in step 166 assumes that the wireless communication device 110 is capable of generating its own location data. In a network-assisted location implementation, the location data server 120 may acquire the location data for the wireless communication device 110 from other known network elements. The process of network-assisted location technology is known in the art and need not be described in greater detail herein. In a network-assisted location implementation, the location data is received from the network by the location data server 120.

In step 168, the location data server 120 transmits the location data for the wireless communication device 110. In step 170, the wireless communication device 106 transmits its location data to the location data server 120. As described above with respect to the wireless communication device 110, the transmission of location data in step 170 assumes that the wireless communication device 106 generates its own location data. However, a network-assisted implementation is also possible for the wireless communication device 106.

In step 172, the location data server 120 transmits the location data for the wireless communication device 106 to the wireless communication device 110. In one implementation, the display 130 (see FIG. 2) of the respective wireless communication devices can display a map with an indicator to show the current location of the other wireless communication device.

Those skilled in the art will appreciate that certain of the steps illustrated in FIG. 3 can be performed in a different sequence. For example, the wireless communication device 106 may send its location data (Step 170) before the location data server 120 relays the location data for the wireless communication device 110 (Step 168). In addition, those skilled in the art will appreciate that this process can extend to more than two wireless communication devices. For example, a group of people may caravan to an event, such as a team traveling to a game, can exchange tokens prior to departing. The exchanged tokens are managed by the location data server as described above with the wireless communication devices 106 and 110. The difference in the group implementation is that each wireless communication device has given its token permission to the location data server 120 and each wireless communication device transmits its location data to the location data server 120. In turn, the location data server 120 shares the location data from each wireless communication device with all of the other wireless communication devices with which the enabling tokens have been shared. In this manner, everyone traveling together would know where each of the other parties traveling with them are currently located.

FIG. 3 illustrates an example where location data is exchanged only a single time. However, those skilled in the art will appreciate that steps 166-172 may be periodically repeated so that the wireless communication devices 106 and 110 are frequently updated as to the location of the other wireless communication device. In accordance with the present teachings, the location data will be shared by the location data server 120 (see FIG. 2) so long as the tokens remain active.

Figure 4:
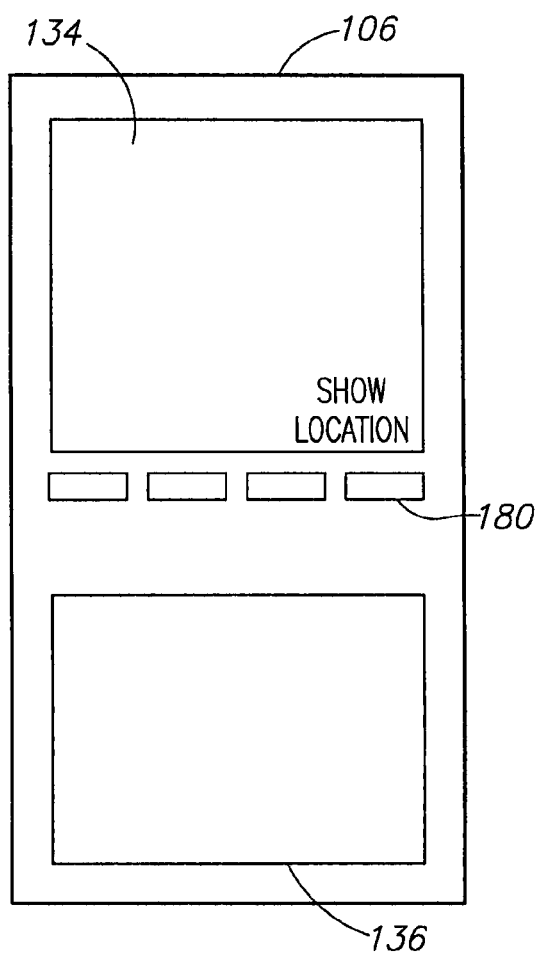
FIG. 4 illustrates a wireless communication device and an alternative technique for enabling the sharing of location data.

The request of a token in step 160 of FIG. 3 may be readily accomplished by a variety of techniques. In one example, shown in FIG. 4, the wireless communication device 106 may include programmable buttons whose function is indicated by an area of the display 130. As illustrated in FIG. 4, the display includes a "Show My Location" button 180 during a call between the first wireless communication device 106 and the second wireless communication device 110. During the course of the telephone call, a user simply activates the "Show My Location" button 180 on the keypad 132. The request token message of step 160 is transmitted through the wireless communication network to the wireless communication device 110 which may display a similar control button in response to the receipt of the request token message. If the user of the wireless communication device 110 presses the "Show My Location" button 180 in response to the request token, the two wireless communication devices will each transmit their respective token permissions to the location data server 120 as illustrated in steps 162 and 164 of FIG. 3. Thus, tokens may be created on an ad hoc basis during the course of a telephone conversation. Such an application may be useful when, by way of example, two individuals are separated at a public event and wish to share their location information with the other person. The location data may be shared during the course of a telephone call to permit sharing of the location data.

Once the location data sharing is authorized, location data may be exchanged on a regular basis until the token is destroyed. In one embodiment, the token may be destroyed when one of the two parties (i.e., users of the wireless communication device 106 and 110) terminates the call.

Once a wireless communication device (e.g., the wireless communication device 106) has given token permission, the programmable control button in the keypad 132 may change from a function, such as "Show My Location" button 180 to a function, such as "Hide My Location." In this manner, the telephone conversation between the two individuals may continue, but location data will no longer be shared since the token is terminated. In another alternative embodiment, the token may continue to be active even when a telephone call is terminated. For example, two individuals (i.e., the users of the wireless communication devices 106 and 110) may grant token permissions to exchange location data during a telephone conversation. The telephone conversation itself may terminate without destroying the tokens. Thus, the wireless communication devices would continue to exchange data without the individual users having to actively engage in a telephone call. The locations of the individual users may be shown on a map on the display 130. The user may destroy the token by activating a button, such as a "Hide My Location" button. In this example, a token may be readily generated and terminated by simple user activities.

Figure 5:
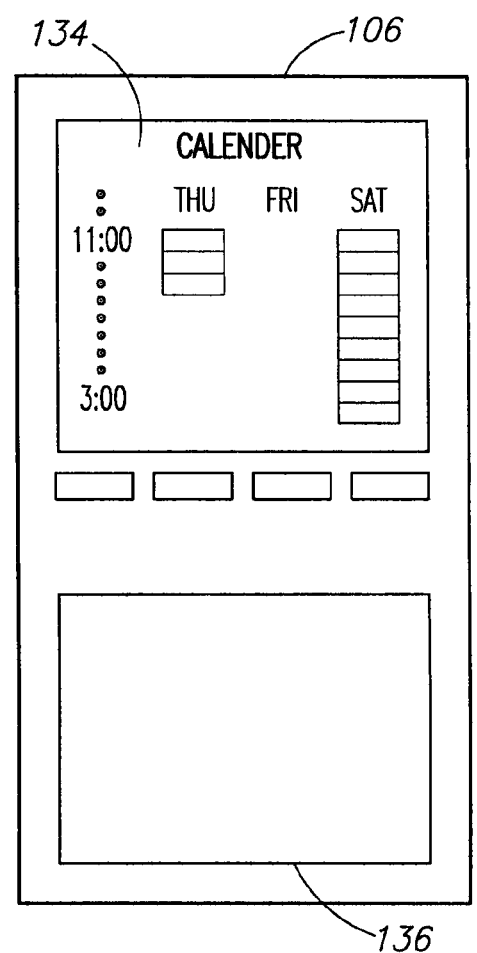
FIG. 5 is an example signaling diagram to illustrate the exchange of token permission data.

In another example, a token may be automatically created by operation of one of the applications 136. For example, token may be automatically created by simple scheduling on a calendar application, which is a common application program on a wireless communication device. In the example of FIG. 5, the calendar is displayed that allows a user to schedule an activity and to invite others to participate in the activity. By accepting participation in an activity, the application (e.g., the calendar application) automatically enters the appointment or activity in the calendar application and, at the appropriate time corresponding to the calendar appointment, the wireless communication device of the user exchanges a token and thereby grants permission to share location data. This approach is particularly useful in a group setting. For example, a group of individuals may be traveling together for a sport activity on a particular day. By scheduling the activity, the user creating the calendar event may also create a time window during which location data will be shared. In this example, the individuals who utilize their wireless communication devices to accept the calendar scheduling will automatically give token permission during the scheduled time period. At the end of the scheduled time period, the token is destroyed and the location sharing process terminated. The user of any wireless communication device may also destroy the token for that particular wireless communication device using other techniques. For example, a particular user may activate a button, such as a "Hide My Location" button to thereby destroy the token for that individual wireless communication device. Other devices that are enabled will continue to exchange location data. It should be noted that location data may be exchanged amongst the wireless communication devices without the devices being required to actively participate in an ongoing telephone call. That is, the wireless communication devices will provide location data to the location data server 120 (see FIG. 2) so long as the device token has been given and the wireless communication device is under power.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-readable medium, for coordinating exchange of location data between a first wireless communication device and a second wireless communication device using token permissions, comprising instructions that, when executed by a processor, cause the processor to perform acts comprising:
   receiving a first token permission from the first wireless communication device;
   receiving a second token permission from the second wireless communication device;
   obtaining first location data corresponding to a location of the first wireless communication device;
   obtaining second location data corresponding to a location of the second wireless communication device; and
   transmitting, in response to receiving the first token permission and receiving the second token permission, the first location data to the second wireless communication device and the second location data to the first wireless communication device.

2. The computer-readable medium of claim 1, wherein:
   the medium is for coordinating exchange of location data between the first wireless communication device, the second wireless communication device, and a third wireless communication device;
   the first token permission indicates permission to share location information, corresponding to the first wireless communication device, with the second wireless communication device and third wireless communication device;
   the second token permission indicates permission to share location information, corresponding to the second wireless communication device, with the first wireless communication device and third wireless communication device; and the instructions further cause the processor to perform acts comprising:
receiving a third token permission, from the third wireless communication device, indicating permission to share location information, corresponding to the third wireless communication device, with the first wireless communication device and second wireless communication device;
obtaining third location data corresponding to a location of the third wireless communication device;
transmitting, in response to receiving the first token permission and receiving the third token permission, the first location data to the third wireless communication device and the third location data to the first wireless communication device; and
transmitting, in response to receiving the second token permission and receiving the third token permission, the second location data to the third wireless communication device and the third location data to the second wireless communication device.

3. The computer-readable medium of claim 1, wherein the instructions further cause the processor to perform the transmitting act in response to:
(i) receiving the first token permission;
(ii) receiving the second token permission; and
(iii) determining, based on the first location information and the second location information, that the first wireless communication device is located within a pre-determined threshold distance of the second wireless communication device.

4. The computer-readable medium of claim 1, wherein the instructions further cause the processor to:
repeat each of:
obtaining the first location data, including any updated first location data representing a new location of the first wireless communication device;
obtaining the second location data, including any updated second location data representing a new location of the second wireless communication device; and
transmitting the first location data to the second wireless communication device and the second location data to the first wireless communication device; and
terminate the transmitting in response to determining that a trigger condition exists.

5. The computer-readable medium of claim 4, wherein the trigger condition is selected from a group of conditions consisting of:
an actual separation distance, separating the first wireless communication device and the second wireless communication device, exceeding a pre-determined threshold distance;
the processor receiving a termination message from the first wireless communication device;
the processor determining that a pre-set threshold time period has expired; and
the processor determining that a certain event has occurred.

6. The computer-readable medium of claim 1, wherein the instructions are configured to cause the processor to:
in obtaining the first location data, receive the first location data from a first source selected from a group of first sources consisting of:
the first wireless communication device; and
a component of a wireless communication network; and
in obtaining the second location data, receive the second location data from a second source selected from a group of second sources consisting of:
the second wireless communication device; and
the component of the wireless communication network.

7. A computer-readable medium, for use at a first wireless communication device to coordinate exchange of location data, between the first wireless communication device and a second wireless communication device, using token permissions, comprising instructions that, when executed by a processor of the first wireless communication device, cause the processor to perform acts comprising:
determining that a pre-determined condition exists, wherein the pre-determined condition is associated with the exchange of location data between the first wireless communication device and the second wireless communication device;
transmitting, in response to determining that the pre-determined condition exists, a first token permission to a remote server;
transmitting first location data, corresponding to a location of the first wireless communication device, to the remote server; and
receiving second location data, corresponding to a location of the second wireless communication device, sent by the remote server in response to the remote server receiving a second token permission from the second wireless communication device.

8. The computer-readable medium of claim 7, wherein the pre-determined condition relates to an operating characteristic of an application of the first wireless communication device.

9. The computer-readable medium of claim 8, wherein:
the application includes a calendaring application; and
the instructions are configured to cause the processor to:
transmit a calendar invitation to the second wireless communication device; and
determine that the pre-determined condition exists in response to the processor receiving an acceptance message sent by the second wireless communication device in reply to the calendar invitation.

10. The computer-readable medium of claim 8, wherein:
the application includes a calendaring application; and
the instructions are configured to cause the processor to determine that the predetermined condition exists in response to the processor determining that a scheduled time associated with a calendar appointment has arrived.

11. The computer-readable medium of claim 10, wherein the instructions are configured to cause the processor to terminate an effectiveness of the first token permission in response to determining that the scheduled time has passed.

12. The computer-readable medium of claim 8, wherein:
the application includes an address-book application; and
the instructions are configured to cause the processor to determine that the predetermined condition exists in response to the processor determining that the second wireless communication device is associated with an address-book contact associated with the address-book application.

13. The computer-readable medium of claim 7, wherein the instructions are configured to cause the processor to transmit a terminate message to the remote server in response to receiving a termination input.

14. The computer-readable medium of claim 13, wherein the instructions are configured to cause the processor to, in receiving the termination input, receive the terminate input from a user of the first wireless communication device.

15. The computer-readable medium of claim 13, wherein the instructions are configured to cause the processor to, in receiving the termination input, determine that a call between the first wireless communication device and the second wireless communication device has ended.

16. The computer-readable medium of claim 7, wherein the pre-determined condition includes the first wireless communication device receiving a token permission request from the second wireless communication device.

17. The computer-readable medium of claim 7, wherein the instructions further cause the processor to transmit a token permission request to the second wireless communication device.

18. A computer-implemented method, performed by a tangible computer device, for coordinating exchange of location data between a first wireless communication device and a second wireless communication device using token permissions, comprising:
- receiving a first token permission from the first wireless communication device;
- receiving a second token permission from the second wireless communication device;
- obtaining first location data corresponding to a location of the first wireless communication device;
- obtaining second location data corresponding to a location of the second wireless communication device; and
- transmitting, in response to receiving the first token permission and receiving the second token permission, the first location data to the second wireless communication device and the second location data to the first wireless communication device.

19. The computer-implemented method of claim 18, wherein:
- (i) receiving the first token permission from the first wireless communication device and (ii) receiving the second token permission from the second wireless communication device are performed while the first wireless communication device is connected in a call with the second wireless communication device; and
- the transmitting, of the first location data to the second wireless communication device and the second location data to the first wireless communication device, is performed following termination of the call.

20. The computer-implemented method of claim 18, wherein:
- (i) receiving the first token permission from the first wireless communication device and (ii) receiving the second token permission from the second wireless communication device are performed while the first wireless communication device is connected in a call with the second wireless communication device; and
- the transmitting, of the first location data to the second wireless communication device and the second location data to the first wireless communication device, is performed during the call between the first wireless communication device and the second wireless communication device.

* * * * *